United States Patent [19]
Burtscher

[11] Patent Number: 5,643,617
[45] Date of Patent: Jul. 1, 1997

[54] APPARATUS FOR SCALING AND MOLDING PIECES OF DOUGH

[76] Inventor: Gunther Burtscher, 52 Huntington Park Drive, Thornhill, Ontario, Canada, L3R 7G5

[21] Appl. No.: 590,664

[22] Filed: Jan. 24, 1996

[51] Int. Cl.⁶ .............................. A21C 5/08; A21C 11/10
[52] U.S. Cl. .................. 425/298; 425/308; 426/503; 426/518; 83/932
[58] Field of Search .................................. 425/308, 309, 425/310, 311, 296, 297, 298, 182, 196; 426/503, 518; 83/932; 264/157

[56] References Cited

U.S. PATENT DOCUMENTS

| | | |
|---|---|---|
| 3,271,502 | 9/1966 | Wentorf, Jr. . |
| 3,555,607 | 1/1971 | Epain et al. . |
| 4,734,024 | 3/1988 | Tashiro et al. ........................ 426/503 |
| 4,767,305 | 8/1988 | Tashiro . |
| 4,883,678 | 11/1989 | Tashiro . |
| 5,286,185 | 2/1994 | Tashiro et al. ........................ 425/308 |
| 5,290,577 | 3/1994 | Tashiro et al. ........................ 426/503 |

*Primary Examiner*—Khanh P. Nguyen
*Attorney, Agent, or Firm*—Ridout & Maybee

[57] ABSTRACT

The invention provides and apparatus for scaling and molding dough which comprises a hopper for the dough and a scaling and molding station which is in flow communication with the hopper so that a portion of the dough can be moved from the hopper to the scaling and molding station. The scaling and molding station has at least one aperture forming assembly at its exit which operates to mold the dough portion by rolling it along its internal walls and to pinch off and eject a dough piece from the apparatus. Preferably, the scaling and molding station has a plurality of stacked aperture forming assemblies which function sequentially. The apparatus may be configured to produce several molded dough pieces simultaneously.

11 Claims, 5 Drawing Sheets

APPARATUS FOR SCALING AND MOLDING PIECES OF DOUGH invention is an apparatus for scaling and molding pieces of dough. The apparatus may be used in a commercial bakery for the production of rolls, buns, bread and other dough products requiring scaling and at least some molding or forming prior to baking.

The production of dough products involves the mixing of a batch of dough followed by the scaling or dividing of the dough into a plurality of dough pieces. As used herein, scaling means measuring a piece of dough by volume or weight. Each dough piece is then molded or shaped into the desired form prior to baking.

Existing devices have a complex means for molding the dough pieces which utilize many moving parts requiring a high level of synchronization and close tolerances. For example, present devices for making buns have means for scaling dough pieces, and each dough piece then is transferred to a molding pocket, or a scaling pocket containing the dough piece, is transferred to a molding station where it is rounded using an oscillating plate or drum which simulates the process of molding by hand. These existing complex machines are very costly to purchase and maintain, and they are limited in their application. Thus, present machines are capable of producing bread rolls having only a narrow range of sizes due to the volumetric limitation of the pockets used for scaling and molding the dough.

The present invention departs from the conventional approach used by existing devices for the production of dough products by providing a device which scales and molds the dough in a single continuous process. The invention has few moving parts compared to prior devices, and is capable of producing products such as yeast breads of a wide range of sizes, e.g., from buns to loaves. The device of the invention can be used to produce molded dough pieces one at a time or to produce a plurality of pieces simultaneously. Because the invention is an apparatus which is much simpler in design than those devices currently available, a considerable savings can be achieved in the initial cost of the device as well as in its ongoing maintenance as compared to prior devices.

Accordingly, the invention provides an apparatus for scaling and molding dough which comprises a hopper for the dough and a scaling and molding station which is in flow communication with the hopper so that a portion of the dough can be moved from the hopper to the scaling and molding station. The scaling and molding station has at least one aperture forming assembly at its exit which operates to mold the dough portion by rolling it along its internal walls and to pinch off and eject a dough piece from the apparatus. Preferably, the scaling and molding station has a plurality of stacked aperture forming assemblies which function much like the fingers of a hand which sequentially close about a moldable mass held in the palm, wherein a piece of the mass is extruded and pinched off by the closing of the last finger.

Each aperture forming assembly has a plurality of pieces which are slidably movable relative to one another so as to open and close one or more apertures. The slidable movement of the pieces can be actuated by moving an upper or a lower toothed member or both simultaneously, which in turn causes internal slidable pieces to move. By operating the aperture forming assemblies with pneumatic actuators, their operations can readily be controlled individually and smoothly. Such an arrangement lends itself to operation by a computerized controller.

Figure 1:
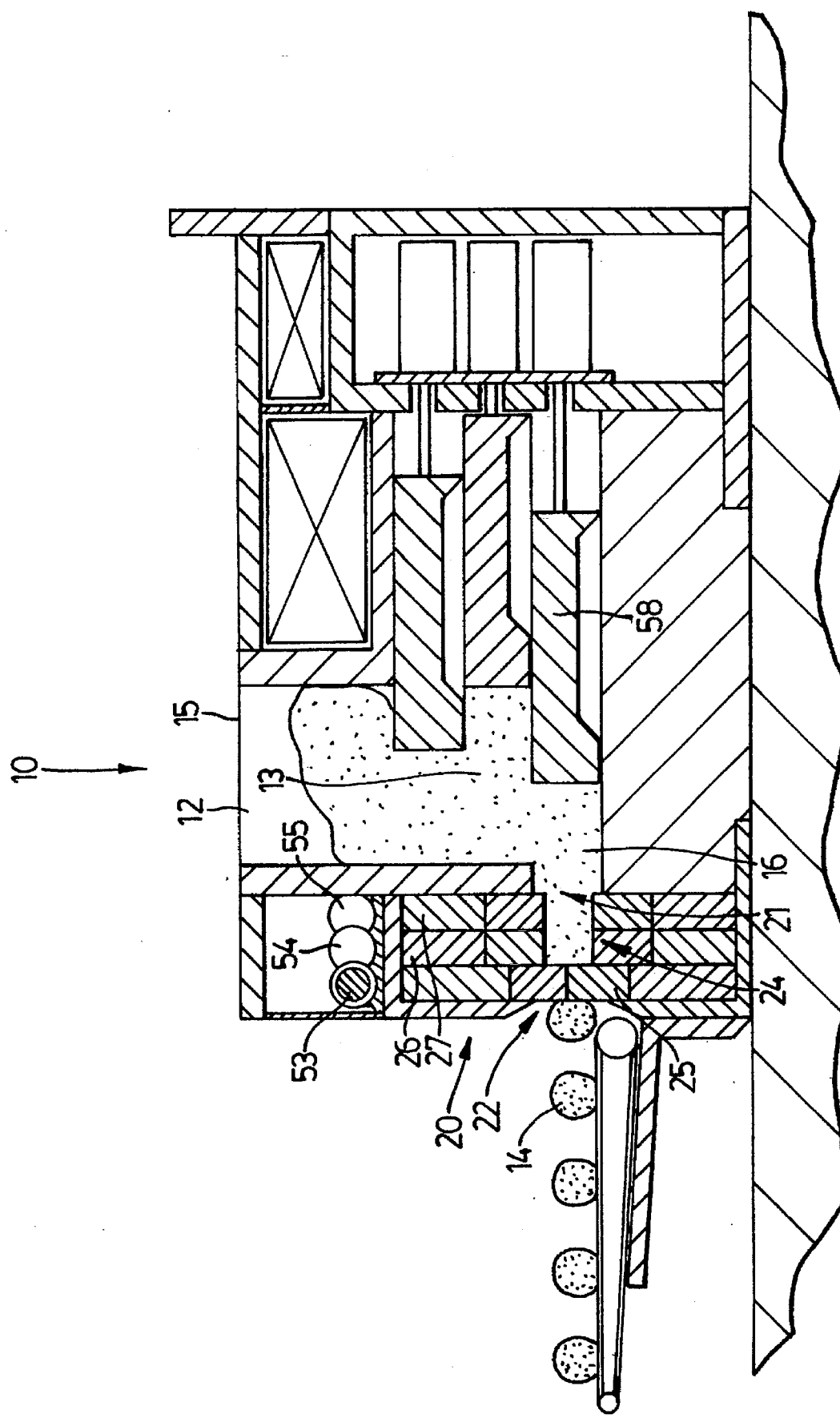
FIG. 1 is a side cross sectional view of an apparatus of the invention.

The apparatus 10 as shown in FIG. 1, comprises a hopper 12 for mixed dough 13. The hopper 12 has an upper opening 15 for receiving the dough 13, and has a lower opening 16 which is in flow communication with a scaling and molding station 20. The scaling and molding station 20 has an inflow end 21 and an outflow end 22, and is sized to provide a pocket 24 for receiving a portion of dough from the hopper 12.

The molding and scaling station 20 has an aperture forming assembly 25 at its outflow end 22. Preferably, two or three such assemblies 25, 26 and 27 are stacked at the outflow end 22 of the station 20. An advantage of having three aperture forming assemblies 25–27 stacked in the molding and scaling station 20, as shown in FIG. 1, is that the size of the pocket 24 can be readily adjusted by sizing the aperture openings to admit the desired quantity of dough 13 from the hopper 12.

Figure 2A:
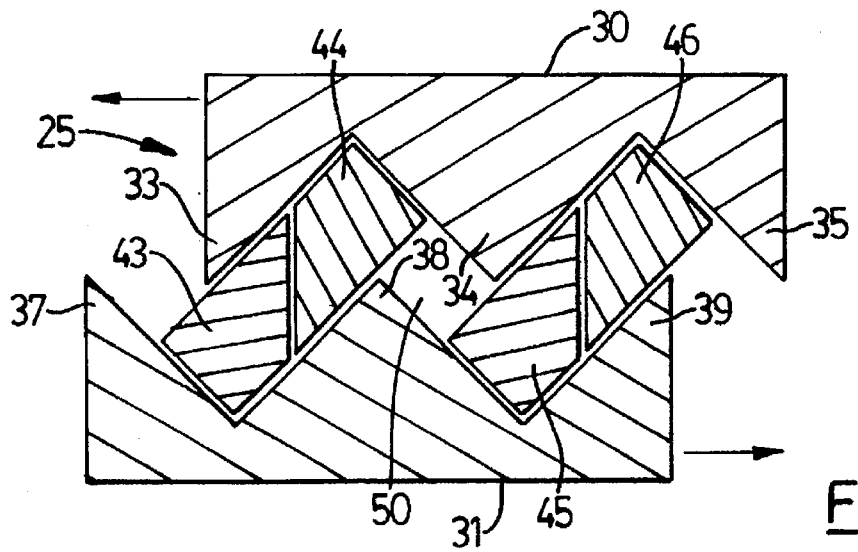
FIGS. 2A, 2B and 2C are side elevational views of an aperture forming assembly.
Figure 2B:
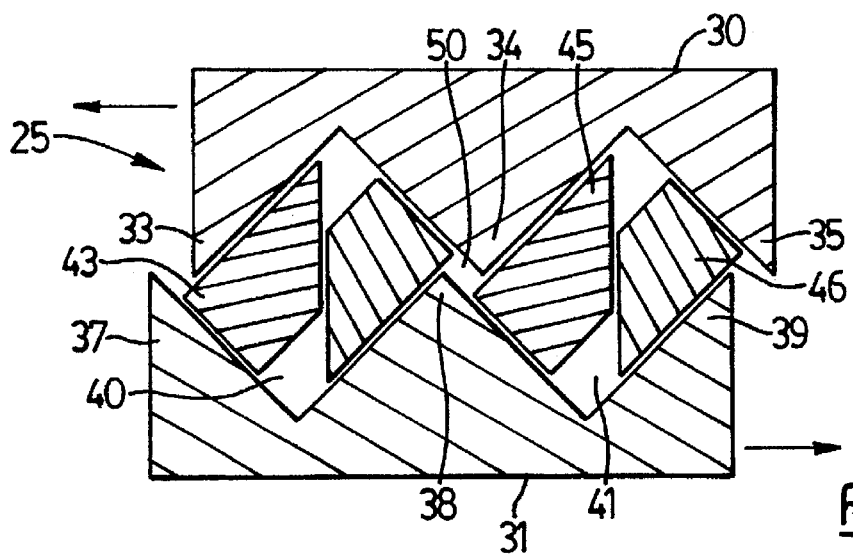
Figure 2C:
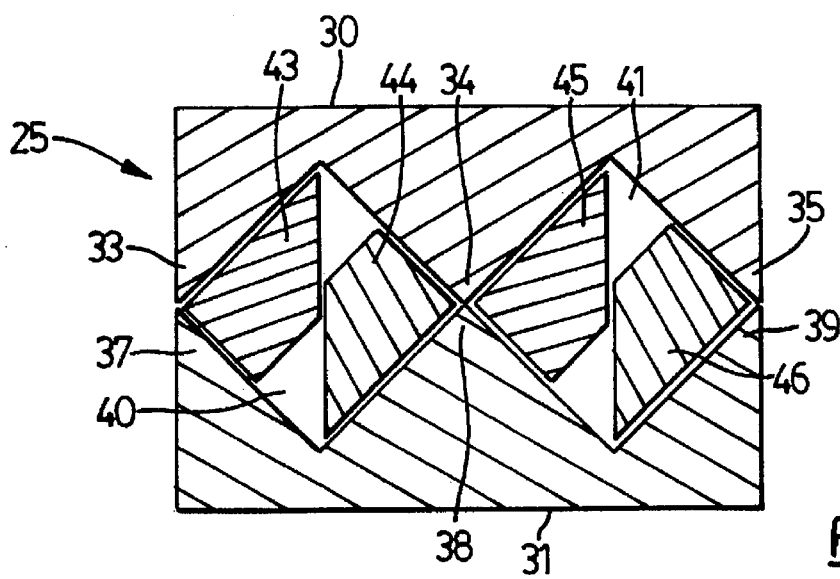

As shown in FIGS. 2A–C, a representative aperture forming assembly 25 has six parts which slidably interact to move between an aperture opened configuration (FIG. 2A) and an aperture closed configuration (FIG. 2C). The assembly 25 has upper and lower opposing toothed members 30 and 31. The upper toothed member 30 has three teeth 33–35, and the lower toothed member 31 has three teeth 37–39. When the teeth 33–35 are aligned with the teeth 37–39 (FIG. 2C), the members 30 and 31 define two spaces 40 and 41. Two quadrilateral-shaped slidable members 43 and 44 are positioned in the space 40, and two quadrilateral-shaped slidable members 45 and 46 are positioned in the space 41. All of the quadrilateral-shaped members 43–46 are identical, and each pair 43, 44 and 45, 46 are oriented to slide in antiparallel directions relative to one another when the toothed members 30 and 31 move in antiparallel directions which are perpendicular to the directions of movement of the quadrilateral-shaped members 43, 44 and 45, 46. When the upper and lower members 30 and 31 are not aligned, an aperture 50 having four sides is defined by one side from each of the teeth 34 and 38 and the quadrilateral-shaped members 44 and 45. The skilled person will appreciate that the aperture forming assemblies can be made using pieces having different geometric shapes than those described. For example, the quadrilateral-shaped members 43–46 are simply right triangles having a champfered corner. Thus, triangular-shaped members could be used by modifying the upper and lower toothed members 30 and 31 accordingly. The foregoing description is intended to illustrate the principle of operation of the aperture forming assemblies, and should not be taken as limiting the geometric configuration of parts which perform the same function in the same manner.

The opening and closing of the aperture 50 can be achieved by the antiparallel movement of the upper and lower toothed members 30 and 31 (see arrows FIGS. 2A–B), or simply by moving one of them. By moving both members 30 and 31 simultaneously, it is possible to maintain the center of the aperture 50 stationary. By moving either the upper or lower member 30 or 31, the center of the aperture 50 moves. For most applications, the latter arrangement is preferred because the structure of the apparatus 10 is simpler, and because the closing of the aperture 50 in this fashion provides added molding of the dough 13 as compared to the case where the center of the aperture 50 remains stationary. As shown in FIG. 1, the aperture forming assemblies 25–27 may be operated using pneumatic cylinders 53–55. Clearly, other drive means for the operation of the assemblies 25–27 are possible, but pneumatic cylinders 53–55 are thought to be the best such means for most applications.

Figure 3A:
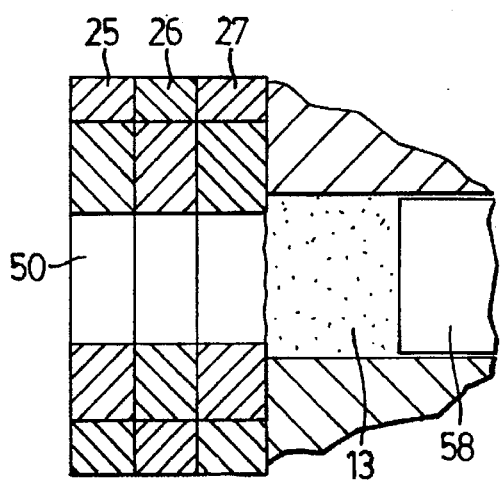
FIGS. 3A, 3B, 3C, 3D, 3E and 3F are side cross sectional views showing the scaling and molding of a dough portion using the stacked aperture forming assemblies of the invention.
Figure 3B:
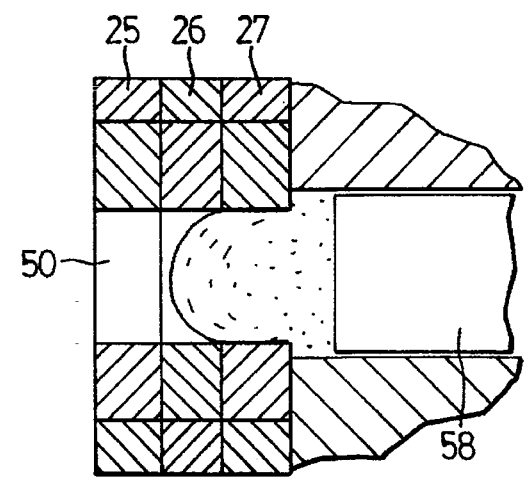
Figure 3C:
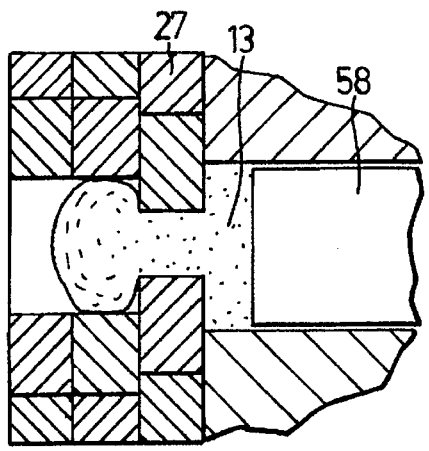
Figure 3D:
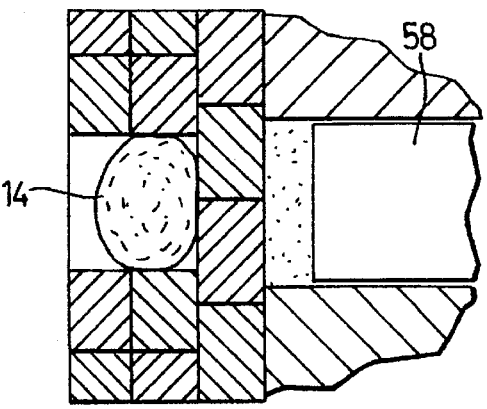
Figure 3E:
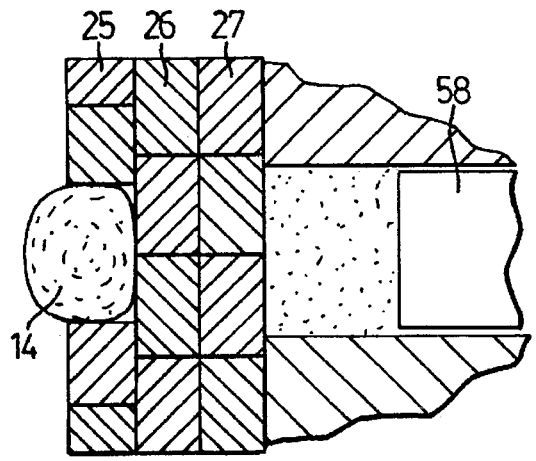
Figure 3F:
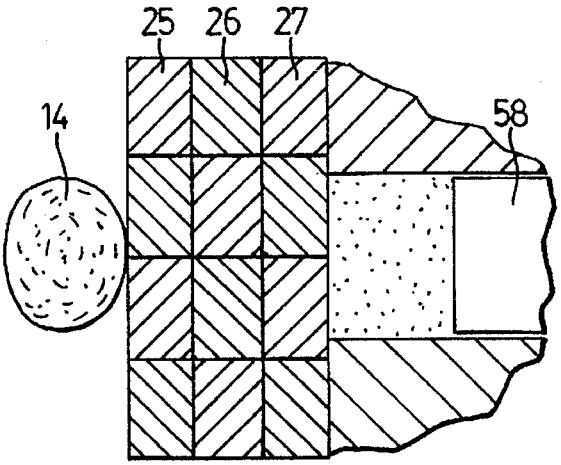

The apparatus 10 of the invention is operated by charging the hopper 10 with a batch of dough 13, and scaling a portion of the dough 13 into the pocket 24 of the scaling and molding station 20 using a dough moving means such as a ram 58 (FIG. 1). Preferably, the ram 58 is pneumatically operated, but mechanical or other drive means may be preferred in certain applications. Using an array of three stacked aperture forming assemblies 25–27, the dough 13 scaled into the pocket 24 may be divided and molded as shown in FIGS. 3A–F. Thus, the aperture forming assemblies 25–27 are opened to the desired size preparatory to the injection of a dough portion 13 (FIG. 3A). Dough 13 is pushed into the opened apertures 50 by the ram 58 (FIG. 35), and the innermost aperture forming assembly 27 is closed (FIGS. 3C–D), thereby dividing a dough piece 14 from the dough 13. This injection of the dough 13 into the apertures 50 and the subsequent pinching off of a dough piece 14 provides a gentle molding of the dough 14 into a ball. Subsequently, the dough piece 14 is additionally molded and extruded through the sequentially closing aperture forming assemblies 26 and 25 (FIGS. 3E–F) and ejected from the apparatus 10. If the apertures 50 of the assemblies 25–27 are closed by moving only one of the toothed members 30 or 31, the dough piece 14 is caused to roll along the internal walls of each assembly 25–27, thereby providing additional molding of the dough piece 14. This arrangement is particularly advantageous for the production of buns and rolls made of bread dough.

Figure 4A:
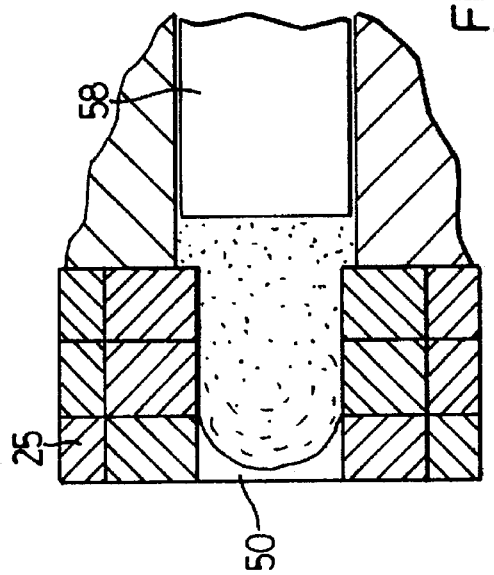
FIGS. 4A, 4B, 4C and 4D are side cross sectional views showing the scaling and molding of a dough portion using a single aperture forming assembly.
Figure 4B:
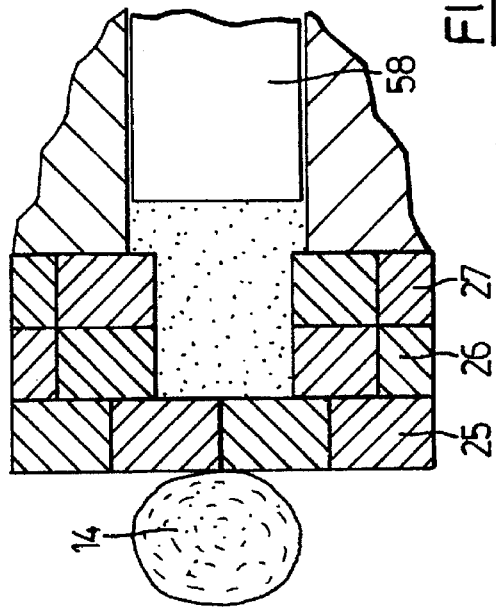
Figure 4C:
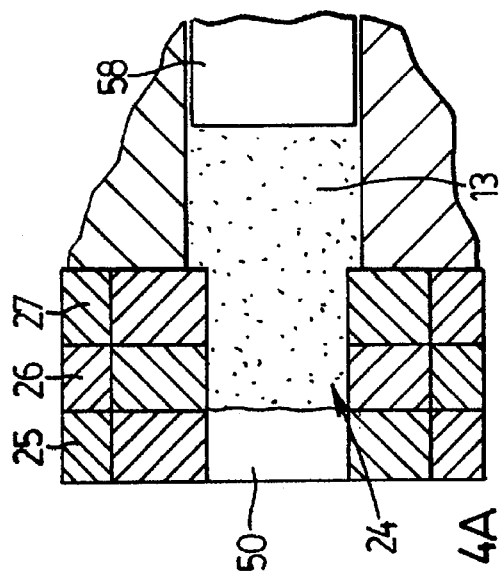
Figure 4D:
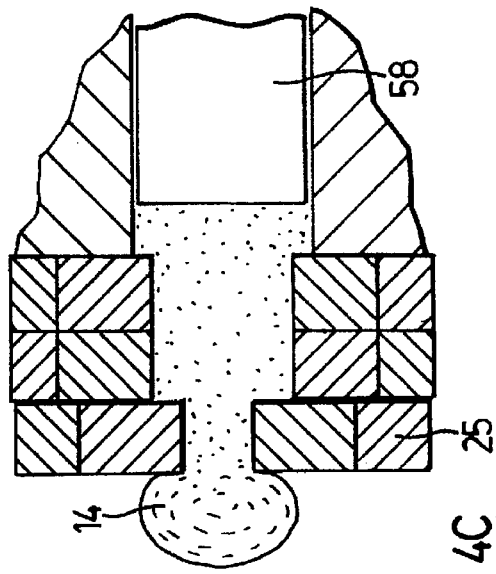

From the foregoing description, the skilled person will appreciate that the apparatus 10 may have more or fewer aperture forming assemblies or some such assemblies in the stack may not be used for some applications. As shown in FIGS. 4A–D, the production of certain types of buns or quick breads or cookies may only require the use of the outermost aperture forming assembly 25. Thus, with the assemblies 25–27 set open at the desired aperture size, a dough portion 13 is pushed into the aperture 50 of the assembly 25 by the ram 58 (FIGS. 4A–B), and the dough 13 is then rounded and divided by the closing of the aperture forming assembly 25 to produce a dough piece 14 which is ejected from the apparatus (FIGS. 4C–D).

Figure 5:
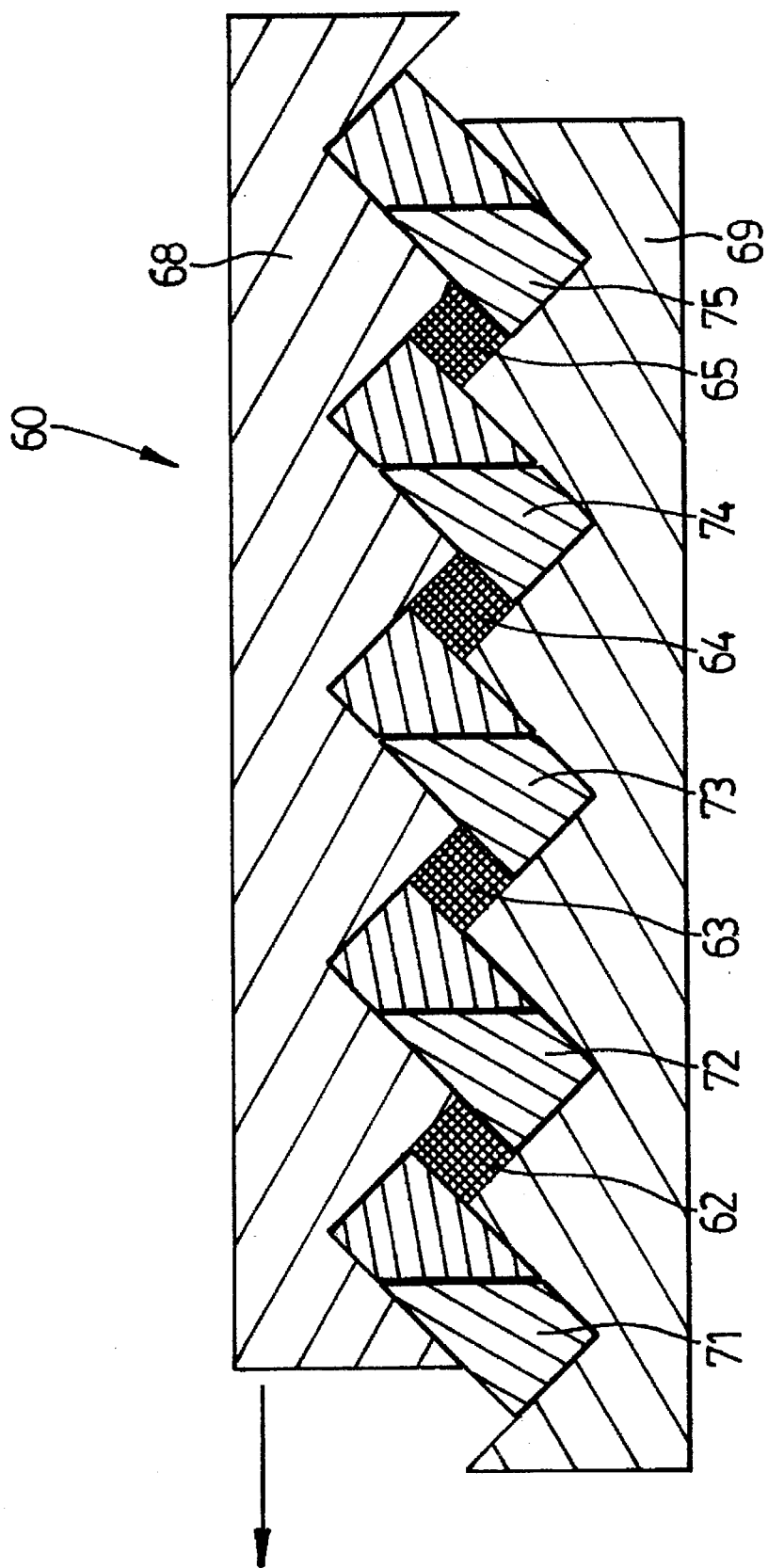
FIG. 5 is a side elevational view of an aperture forming assembly having four apertures.

Also, the aperture forming assembly can be configured to form a plurality of apertures, and thereby, the apparatus 10 can produce a plurality of molded dough pieces 14 simultaneously. Accordingly, FIG. 5 shows an aperture forming assembly 60 for the opening and closing of four aperture 62–65. The assembly 60 has upper and lower opposing toothed members 68 and 69, each of which has six teeth which, when aligned, define five spaces 71–75 in which are positioned five pairs of quadrilateral-shaped members. Thus, the aperture forming assembly 60 is an extended version of the assembly 25 described, and it operates in the same fashion, preferably by means of a pneumatic cylinder.

I claim:

1. An apparatus for scaling and molding dough, comprising:

a hopper having an upper opening for receiving and walls for holding a batch of dough, the hopper having a opening at its lower end through which the dough may pass;

a scaling and molding station in flow communication with the hopper through its lower opening, the station having walls defining a dough receiving pocket with inflow and outflow ends and having an aperture forming assembly at the outflow end, the assembly comprising upper and lower opposing toothed members which are slidably disposed relative to one another and which when aligned define at least two spaces between at least three sets of opposing teeth of the members, in each of which spaces there are positioned two slidable members which coact with the toothed members to limit the movement of the toothed members relative to one another between an aperture opened configuration and an aperture closed configuration, the aperture opened configuration being obtained when the opposing toothed members are out of alignment with one another, and the aperture closed configuration being obtained when the toothed members are in alignment with one another, each aperture formed by said assembly is four sided with one side being provided by each of the opposing toothed members and one of the slidable members in each said space; and means for moving a portion of dough in the hopper from the opening at its lower end and into the scaling and molding station, wherein a dough piece is scaled, molded and ejected from the apparatus by the action of the aperture forming assembly.

2. An apparatus as claimed in claim 1, wherein the scaling and molding station has a stacked array of a plurality of aperture forming assemblies.

3. An apparatus as claimed in claim 2, wherein the molding station has a stacked array of three aperture forming assemblies.

4. An apparatus as claimed in claim 1, wherein the aperture forming assembly is moved between the opened and closed configurations by means of a pneumatic cylinder.

5. An apparatus as claimed in claim 1, wherein the aperture forming assembly is moved between the opened and closed configurations by movement of either the upper or the lower toothed member.

6. An apparatus as claimed in claim 1, wherein the aperture forming assembly is moved between the opened and closed configurations by movement of both the upper and lower toothed members.

7. An apparatus as claimed in claim 1, wherein the slidable members are quadrilateral-shaped.

8. An apparatus as claimed in claim 1, wherein each pair of slidable members are oriented to slide in antiparallel directions relative to one another when the toothed members move in antiparallel directions which are perpendicular to the directions of movement of the slidable members.

9. An apparatus as claimed in claim 8, wherein the slidable members are quadrilateral-shaped.

10. An apparatus as claimed in claim 1, wherein the aperture forming assembly is configured to form a plurality of apertures.

11. An apparatus as claimed in claim 1, wherein the means for moving a portion of the dough from the hopper to the scaling and molding station is a ram.

* * * * *